United States Patent [19]
Nishiyama

[11] Patent Number: 5,875,002
[45] Date of Patent: Feb. 23, 1999

[54] CLAMP PULSE CIRCUIT

[75] Inventor: Seiichi Nishiyama, Kanagawa, Japan

[73] Assignee: Sony Corporation, Tokyo, Japan

[21] Appl. No.: 581,375

[22] Filed: Dec. 29, 1995

[30] Foreign Application Priority Data

Jan. 12, 1995 [JP] Japan ................................ 7-003028

[51] Int. Cl.⁶ .............................. H04N 5/06; H04N 5/18; H04N 5/16
[52] U.S. Cl. .......................... 348/691; 348/695; 348/521
[58] Field of Search ................................ 348/689, 691, 348/694, 695, 696, 558, 554, 522, 521, 510, 516, 257; H04N 5/16, 5/18

[56] References Cited

U.S. PATENT DOCUMENTS

| 4,460,918 | 7/1984 | Flasza ....................................... 348/554 |
| 5,280,356 | 1/1994 | Hiramatsu et al. ...................... 348/691 |

FOREIGN PATENT DOCUMENTS

63-7081A  1/1988  Japan .............................. H04N 5/18
426280A   1/1992  Japan .............................. H04N 5/16

*Primary Examiner*—John K. Peng
*Assistant Examiner*—Vivek Srivastava
*Attorney, Agent, or Firm*—Ronald P. Kananen

[57] ABSTRACT

A clamp pulse generating circuit comprising a synchronizing decision circuit for deciding whether an external synchronizing pulse is being input or not; an exclusive-OR circuit, a change-over switch and a pulse width detecting circuit for deciding whether a video signal containing a synchronizing pulse is being input or not; and a pulse generating circuit for generating a clamp pulse at the front or rear edge of the external synchronizing pulse output from a synchronizing separator circuit, and outputting the clamp pulse at the front edge selected by a selection switch when the external synchronizing pulse is being input and forcing to select and output the clamp pulse at the rear edge of the synchronizing pulse irrespective of the presence of the external synchronizing pulse when the video signal containing the synchronizing pulse is being input.

3 Claims, 7 Drawing Sheets

CLAMP PULSE CIRCUIT

BACKGROUND OF THE INVENTION

1. Field of the Invention

The present invention relates to a clamp pulse generating circuit and more particularly to a circuit for generating clamp pulses used for keeping a pedestal level of a brightness signal in a video signal at a constant level.

2. Description of the Related Art

Because the DC component is lost in a capacitive coupling amplifier circuit and colors of color images cannot be reproduced faithfully in a video signal processing circuit, a pedestal clamp, in which a pedestal level of a brightness signal is clamped by clamp pulses to keep it at a constant level, is used to reproduce the DC component lost by the capacitive coupling. A circuit for generating the clamp pulses used for the pedestal clamp has been adapted to generate the pulses in a timing slightly behind a horizontal synchronizing pulse.

Figure 1:
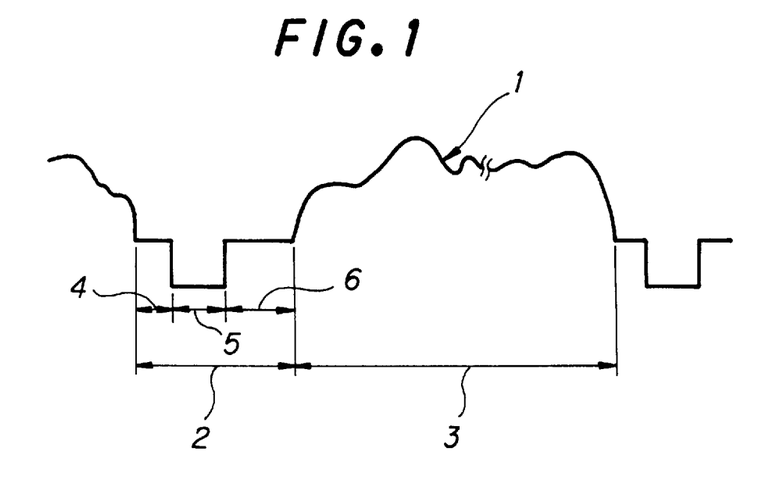
FIG. 1 is a waveform chart of a green video signal.

In a pedestal clamp circuit using the clamp pulse generating circuit constructed as described above, the pedestal level has been clamped at a back porch 6 in a horizontal blanking period 2 of a video signal 1 shown in FIG. 1, because the clamp pulse is generated in the timing behind the horizontal synchronizing pulse. However, in the field of computer displays and the like, horizontal frequency tends to be increased with the increase of the resolution and because the gap of the back porch portion 6 becomes narrow as the horizontal frequency is increased, a pulse width of the clamp pulse has to be narrowed.

Then, a problem with increased power consumption occurs when the pulse width of the clamp pulse is set narrower because an output impedance at an output stage has to be lowered so as not to blunt the waveform of the clamp pulse in the clamp pulse generating circuit. When the blunted waveform of the clamp pulse is input to the pedestal clamp circuit on the other hand, it poses a problem in which an accurate pedestal level cannot be held or, in the worst case, the pedestal clamp cannot be performed.

Accordingly, it is an object of the present invention to provide a clamp pulse generating circuit which can generate a clamp pulse having a desired pulse width in generating the clamp pulse at an external synchronizing pulse.

SUMMARY OF THE INVENTION

A clamp pulse generating circuit of the present invention comprises a synchronizing input terminal for inputting an external synchronizing pulse; synchronizing decision means for deciding whether the external synchronizing pulse is being input; a video input terminal for inputting a video signal containing a synchronizing pulse; video decision means for deciding the presence of input of the video signal; pulse generating means for generating a clamp pulse at the front edge of the external synchronizing pulse when the result of decision of the synchronizing decision means indicates that the inputted external synchronizing pulse is present and for generating a clamp pulse at the rear edge of the synchronizing pulse when the result of decision of the video decision means indicates that the inputted video signal is present, irrespective of the result of decision of the synchronizing decision means; and a clamp pulse output terminal for outputting the clamp pulses generated by the pulse generating means to the outside.

In the clamp pulse generating circuit constructed as described above, the synchronizing decision means decide that the external synchronizing pulse has been input when it has been input to the synchronizing input terminal. Then, the pulse generating means generate a clamp pulse at the front edge of the external synchronizing pulse when the decision result that the external synchronizing pulse has been input is received. Meanwhile, the video decision means decide that the video signal containing the synchronizing signal has been input when it has been input to the video input terminal. Then, the pulse generating means generate a clamp pulse at the rear edge of the synchronizing pulse within the video signal when the decision result that the video signal has been input is received.

As a special case, both the external synchronizing pulse and the video signal containing the synchronizing signal are input. In such a case, the pulse generating means generate the clamp pulse at the rear edge of the synchronizing pulse irrespective of whether the external synchronizing pulse has been input, as the video decision means decide that the video signal has been input.

The specific nature of the present invention, as well as other objects, uses and advantages thereof, will clearly appear from the following description and from the accompanying drawings.

DETAILED DESCRIPTION OF PREFERRED EMBODIMENTS

Preferred embodiments of the present invention, applied to a computer display for example, will be explained in detail below with reference to the drawings. It should noted that the computer display is provided with each channel of R (red), G (green) and B (blue) as external connecting terminals and that there are five kinds of patterns for inputting a synchronizing pulse, as follows:

Mode 1: external horizontal synchronizing pulse and green video signal containing synchronizing signal;

Mode 2: external composite synchronizing pulse and green video signal containing synchronizing signal;

Mode 3: external horizontal synchronizing pulse;

Mode 4: external composite synchronizing pulse; and

Mode 5: green video signal containing synchronizing signal.

The green video signal containing the synchronizing signal above refers to a video signal input only to the G channel while containing the synchronizing signal.

Figure 2:
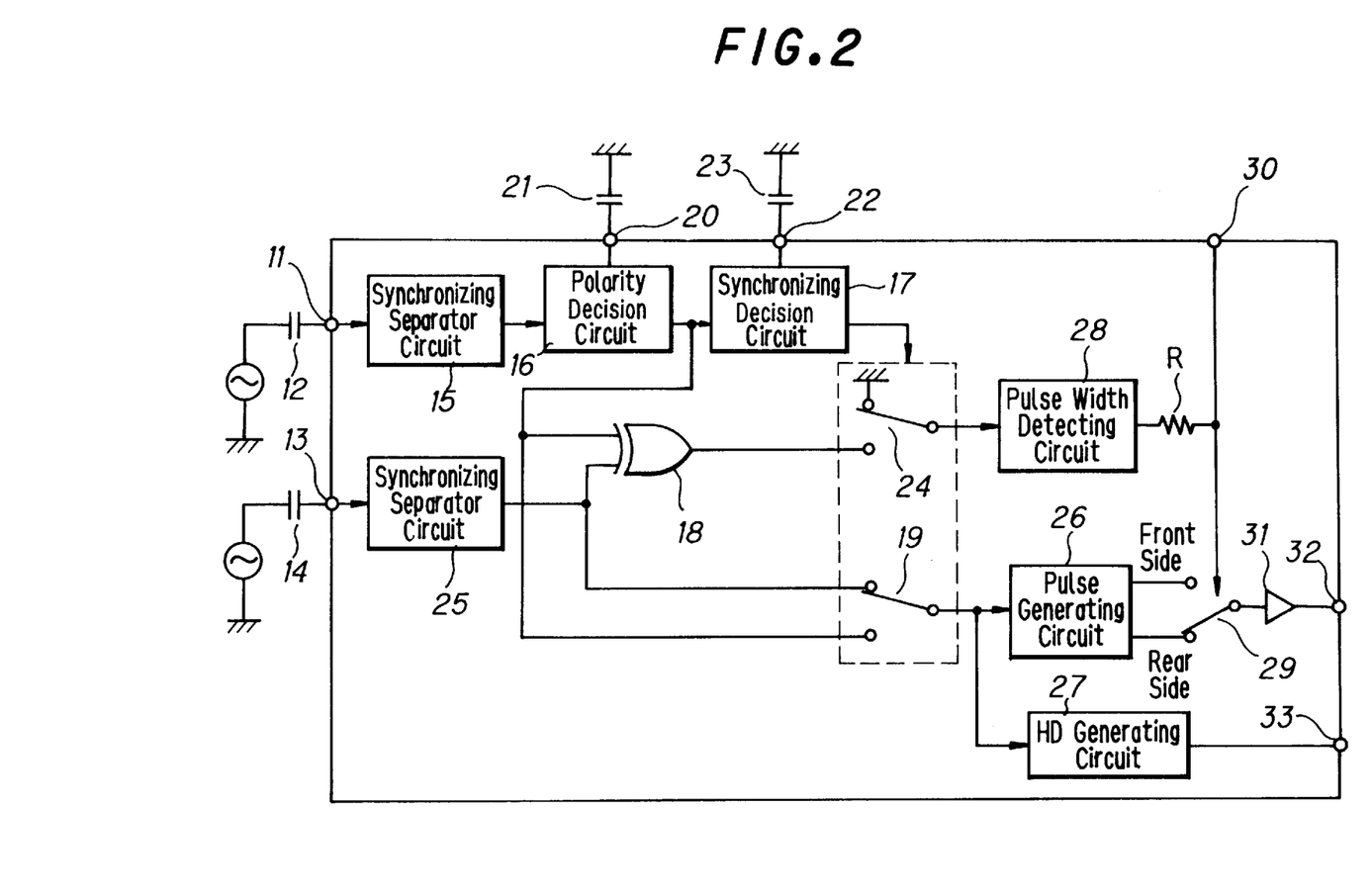
FIG. 2 is a block diagram illustrating a first embodiment of the present invention.

FIG. 2 is a block diagram illustrating a first embodiment of the clamp pulse generating circuit of the present invention. In the figure, an external horizontal synchronizing pulse H or an external composite synchronizing pulse CS containing a horizontal synchronizing pulse and a vertical synchronizing pulse is input as an external synchronizing pulse to a synchronizing input terminal 11 via an AC coupling capacitor 12. Further, a composite video signal containing a synchronizing pulse such as a horizontal synchronizing pulse and a vertical synchronizing pulse is input to a video input terminal 13 via an AC coupling capacitor 14. As the composite video signal, the green video signal containing the synchronizing signal described above is input. The external horizontal synchronizing pulse H or the external composite synchronizing pulse CP input to the synchronizing input terminal 11 is supplied to a synchronizing separator circuit 15, which separates the synchronizing signal by having a predetermined slicing level. The horizontal synchronizing pulse separated by the synchronizing separator circuit 15 is supplied to a synchronizing decision circuit 17 via a polarity decision circuit 16 and is also input to one side of an exclusive-OR circuit 18 and a change-over switch 19.

A capacitor 21 is connected between the polarity decision circuit 16, via an external connecting terminal 20, and ground. The polarity decision circuit 16 decides whether the polarity of the horizontal synchronizing pulse is positive or negative and outputs negative polarity pulses as positive polarity pulses. A capacitor 23 is connected between the synchronizing decision circuit 17, via an external connecting terminal 22, and ground. The synchronizing decision circuit 17 decides whether an external synchronizing pulse has been input with composing a peak hold circuit by the capacitor 23 and outputs a decision result of "H" level when the external synchronizing pulse has been input and of "L" level when no external synchronizing pulse has been input. This decision output becomes a switching control signal of the change-over switches 19 and 24.

Meanwhile, the green video signal containing the synchronizing signal input to the video input terminal 13 is supplied to a synchronizing separator circuit 25. The synchronizing separator circuit 25 separates the synchronizing signal by having a predetermined slicing level. The horizontal synchronizing pulse separated by the synchronizing separator circuit 25 is input to the exclusive-OR circuit 18 and the change-over switch 19. An output of the exclusive-OR circuit 18 becomes an input of one side of the change-over switch 24. The change-over switch 24 receives the ground (GND) level as the other input. The change-over switches 19 and 24 are controlled by the decision output of the synchronizing decision circuit 17.

That is, when the synchronizing decision circuit 17 decides that an external synchronizing pulse is being input, the change-over switch 19 selects the horizontal synchronizing pulse output from the synchronizing separator circuit 15 and the change-over switch 24 selects the output of the exclusive-OR circuit 18, respectively. When the synchronizing decision circuit 17 decides that no external synchronizing pulse is being input, the change-over switch 19 selects the horizontal synchronizing pulse output from the synchronizing separator circuit 25 and the change-over switch 24 selects the ground level, respectively. A selection output of the change-over switch 19 is supplied to a pulse generating circuit 26 and an HD generating circuit 27. A selection output of the change-over switch 24 is supplied to a pulse width detecting circuit 28.

When the horizontal synchronizing pulse is input, the pulse generating circuit 26 generates a clamp pulse having a predetermined pulse width at the front edge thereof and a clamp pulse having a predetermined pulse width at the rear edge thereof. The physical structure of circuit 26 will be described later. Those two clamp pulses become two inputs of a change-over switch 29. The change-over switch 29 selects either of the clamp pulses in response to a detection output of the pulse width detecting circuit 28 supplied via a resistor R. Further, when a control signal is input from outside via a control input terminal 30, it forces selection of the clamp pulse at the front edge of the horizontal synchronizing pulse when the control signal is at the "H" level and the clamp pulse at the rear edge when the control signal is at the "L" level, irrespective of the detection output of the pulse width detecting circuit 28.

Because a difference between a horizontal blanking section and a horizontal synchronizing section is about 600 ns, in the case of a signal in which the difference is considered to be narrowest, the pulse width detecting circuit 28 is constructed so as to generate the "H" level detection output when the pulse width of an input pulse is wider than a time which corresponds to that difference of the sections and to generate the "L" level output when it is narrower. The clamp pulse selected by the change-over switch 29 is lead to the outside through a CPL output terminal 32 via a buffer 31. Meanwhile, the HD generating circuit 27 generates an HD pulse at the input horizontal synchronizing pulse. The HD pulse is lead to the outside through a HD output terminal 33.

In the circuit constructed as described above, the exclusive-OR circuit 18, the change-over switch 24 and the pulse width detecting circuit 28 compose video decision means for deciding whether the green video signal containing the synchronizing pulse has been input.

The operation of the circuit of the video decision means will be explained below on the basis of a waveform chart of each input pattern shown in FIG. 3. In the case of the synchronizing input modes 3 and 4 described above, the green video signal having no synchronizing pulse and the external horizontal synchronizing pulse H or the external composite synchronizing pulse CS are input in the computer display.

Figure 3:
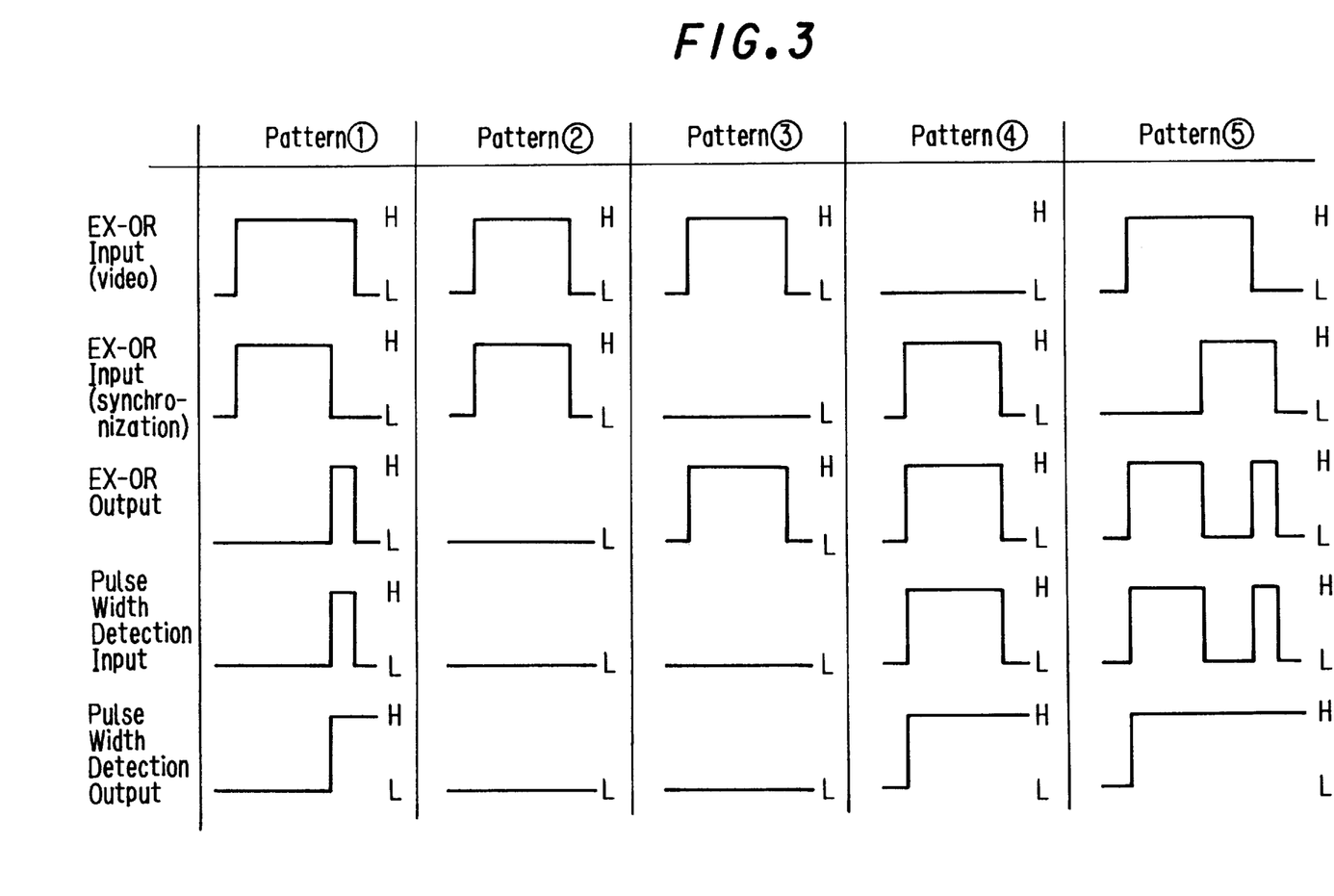
FIG. 3 is a waveform chart for explaining operations for deciding whether a video signal containing a synchronizing pulse is been input or not.

In this case, a signal in the horizontal blanking section of the video input and the horizontal synchronizing pulse become the two inputs of the exclusive-OR circuit 18 as shown in Pattern 1 in FIG. 3 and the logic level of those two inputs differ in the section corresponding to the difference between the horizontal blanking section and the horizontal synchronizing section, so that a pulse signal having a pulse width which corresponds to the difference of these section is output from the exclusive-OR circuit 18 and is input to the pulse width detecting circuit 28 via the change-over switch 24. The pulse width of this input pulse is more than 600 ns for the reason described above. Accordingly, the pulse width detecting circuit 28 generates the "H" level detection output indicating that the green video signal input together with the external synchronizing pulse has no synchronizing pulse.

Next, in case of modes 1 and 2, both the green video signal containing the synchronizing pulse and the external horizontal synchronizing pulse H or external composite synchronizing pulse CS are input. In this case, the two inputs of the exclusive-OR circuit 18 are both horizontal synchronizing pulses as shown in Pattern 2 in FIG. 3 and the logic level of the two inputs completely agree each other, so that an "L" level signal is output from the exclusive-OR circuit 18 and is input to the pulse width detecting circuit 28 via the change-over switch 24. The pulse width at this time is zero. Accordingly, the pulse width detecting circuit 28 generates the "L" level detection output indicating that the green video signal input together with the external synchronizing pulse has the synchronizing pulse.

In the case of mode 5, because only the green video signal containing the synchronizing pulse is input, the logic level of the two inputs of the exclusive-OR circuit 18 differ in the horizontal synchronizing section as shown in Pattern 3 in FIG. 3 and the exclusive-OR circuit 18 outputs an "H" level signal. However, because no external synchronizing pulse has been input at this time, the change-over switch 24 selects the ground level from the result of the decision of the synchronizing decision circuit 17 and inputs it to the pulse width detecting circuit 28. Accordingly, the pulse width detecting circuit 28 generates the "L" level detection output indicating that the green video signal input to the video input terminal 13 has the synchronizing pulse.

As it is apparent from the above explanation of the operation, the video decision means comprising the exclusive-OR circuit 18, the change-over switch 24 and the pulse width detecting circuit 28 can decide that the green video signal containing the synchronizing pulse has been input to the video input terminal 13, regardless of whether the external horizontal synchronizing pulse H or the external composite synchronizing pulse CS has been input.

Figure 4A:
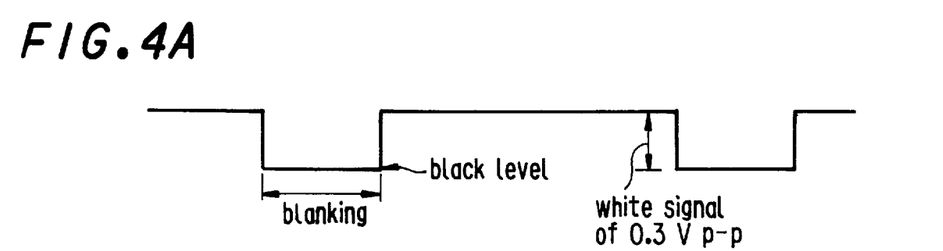
FIGS. 4A and 4B are waveform charts of video signals in a special input pattern 4 in FIG. 3.
Figure 4B:
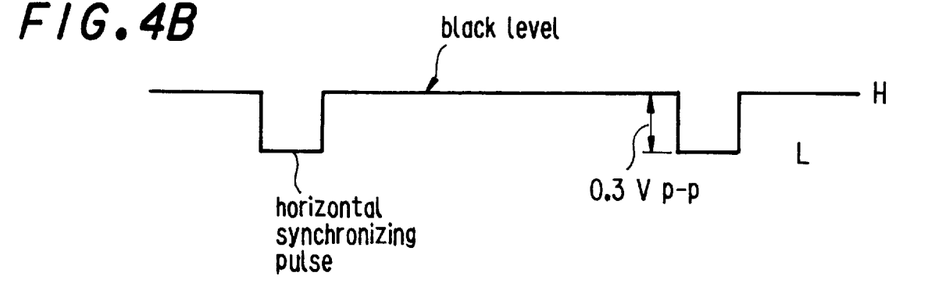

Incidentally, because a white video signal of about 0.3 V having no synchronizing pulse shown in FIG. 4A and a full black video signal having synchronizing pulses and having almost equal horizontal synchronizing sections and horizontal blanking sections shown in FIG. 4B closely resemble each other, it is difficult to distinguish the signals by way of analog signal processing and the former video signal shown in FIG. 4A may be erroneously indicated as a video signal having synchronizing pulses even though it has no synchronizing signal.

However, noticing the difference (about 600 ns) between the horizontal blanking section and the horizontal synchronizing section, the video decision means of the present embodiment, constructed as described above, decide whether the video signal containing synchronizing pulse has been input or not on the basis of the difference of the sections, so that it can distinguish the white video signal of about 0.3 V having no synchronizing pulse in FIG. 4A from the full black video signal having the synchronizing pulses and having almost equal horizontal synchronizing sections and horizontal blanking sections in FIG. 4B, and will not erroneously indicate the video signal in FIG. 4A as a video signal containing synchronizing pulses.

As a special pattern, there is a pattern (Pattern 4 in FIG. 3) in which a video signal whose horizontal blanking section is black level is input together with the external horizontal synchronizing pulse H or the external composite synchronizing pulse CS. In this case, because the logic level of the two inputs to the exclusive-OR circuit 18 differ from each other, a signal having the same pulse width with the horizontal synchronizing pulse is output from the exclusive-OR circuit 18 and is input to the pulse width detecting circuit 28 via the change-over switch 24. Thereby, the pulse width detecting circuit 28 generates the "H" level detection output indicating that the video signal input together with the external synchronizing pulse has no synchronizing pulse.

Figure 5A:
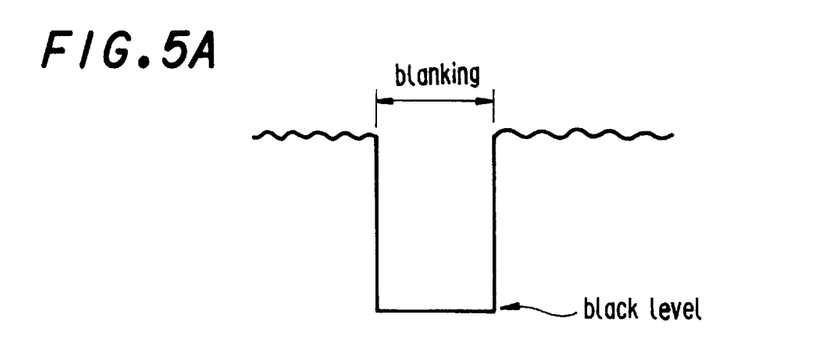
FIGS. 5A and 5B are waveform charts showing a timing relationship between a video signal and a horizontal synchronizing pulse in a special input pattern 5 in FIG. 3.
Figure 5B:
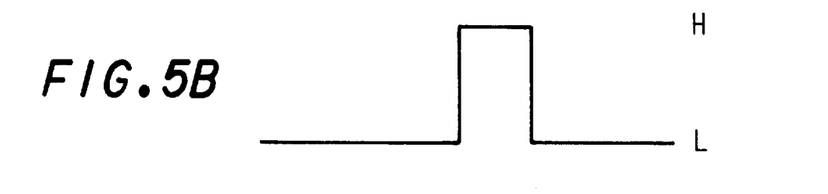

There is also another pattern (Pattern 5 in FIG. 3) in which the external horizontal synchronizing pulse H or the external composite synchronizing pulse CS shown in FIG. 5B is input in a timing overstepping the horizontal blanking period of the green video signal shown in FIG. 5A. In this case, because the logic level of the two inputs to the exclusive-OR circuit 18 differ partially, the "H" level signal is output from the exclusive-OR circuit 18 in the period the logic levels differ and is input to the pulse width detecting circuit 28 via the change-over switch 24. Because the pulse width of the input pulse is more than 600 ns, the pulse width detecting circuit 28 generates the "H" level detection output indicating that the video signal input together with the external synchronizing pulse has no synchronizing pulse.

Next, the operation of the circuit constructed as described above will be explained with reference to waveform charts in FIGS. 6A through 6C. The mode in which the external horizontal synchronizing pulse H or the external composite synchronizing pulse CS is input to the synchronizing input terminal 11 as the synchronizing input will be explained first. This mode corresponds to the synchronizing input modes 3 and 4 described above in the computer display. In the case of modes 3 and 4, the synchronizing decision circuit 17 decides whether the external synchronizing pulse is being input, and the "H" level decision output is supplied to the change-over switches 19 and 24 if the input is occurring. Thereby, the change-over switch 19 selects the horizontal synchronizing pulse output from the synchronizing separator circuit 15 and supplies it to the pulse generating circuit 26.

Figures 6A, 6B:
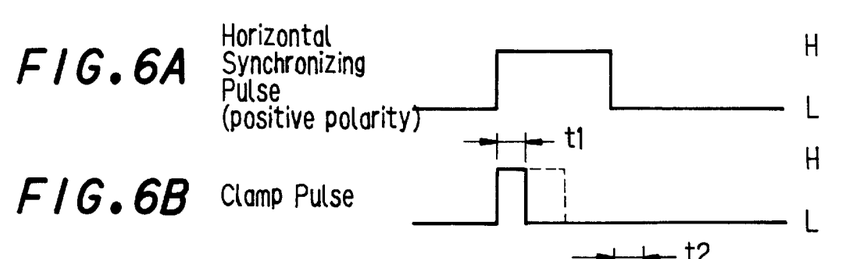
FIGS. 6A through 6C are waveform charts for explaining the operation of the embodiment shown in FIG. 2.
Figure 6C:
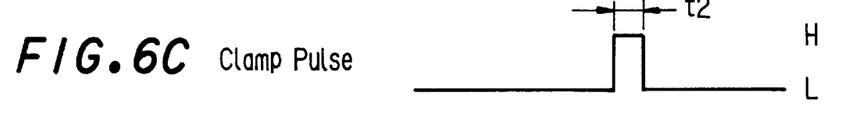

Then, the pulse generating circuit 26 generates a clamp pulse having a pulse width t1 shown in FIG. 6B at the front edge (leading edge) of the inputted horizontal synchronizing pulse shown in FIG. 6A as well as a clamp pulse having a pulse width t2 shown in FIG. 6C at the rear edge (trailing edge) thereof. At this time, because the pattern of the two inputs to the exclusive-OR circuit 18 is Pattern 1 in FIG. 3, the "H" level signal indicating that the green video signal input together with the external synchronizing pulse has no synchronizing pulse is output from the pulse width detecting circuit 28. Thereby, the change-over switch 29 selects the clamp pulse having the pulse width t1 at the front edge in FIG. 6B and outputs it to the outside via the buffer 31 and the CPL output terminal 32.

When the external synchronizing pulse is input, as in the case of the modes 3 and 4, there is enough margin between the generating timing of the clamp pulse in FIG. 6B and the video section in clamping a pedestal level of a color video signal by the clamp pulse in FIG. 6B, by generating it at the front edge of the horizontal synchronizing pulse shown in FIG. 6A, so that the pulse width t1 of the clamp pulse in FIG. 6B can be fully widely set. The pedestal level can be accurately held in clamping the pedestal by widely setting the pulse width t1 of the clamp pulse in FIG. 6B as described above.

The case of the mode 5 in which the green video signal containing the synchronizing pulse is input to the video input terminal 13 as the synchronizing input will be explained next. In the case of the mode 5, because no external synchronizing pulse is input to the synchronizing input terminal 11, the synchronizing decision circuit 17 determines that "no external synchronizing pulse is being input" and a "L" level decision output is supplied to the change-over switches 19 and 24. Thereby, the change-over switch 19 selects the horizontal synchronizing pulse output from the synchronizing separator circuit 25 and supplies it to the pulse generating circuit 26. Then, the pulse generating circuit 26 generates clamp pulses shown in FIG. 6B and 6C at the front and rear edges of the horizontal synchronizing pulse shown in FIG. 6A in the same manner as in modes 3 and 4.

Figure 7:
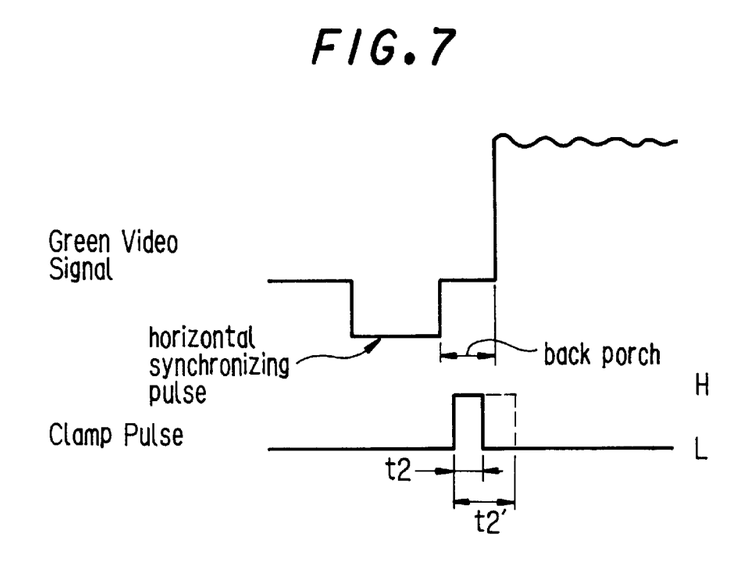
FIG. 7 is a waveform chart for explaining the operation of the mode 5.

Because the pattern of the two inputs to the exclusive-OR circuit 18 is Pattern 3 in FIG. 3, the "L" level signal, indicating that the green video signal input together with the external synchronizing pulse and having the synchronizing pulse, is output from the pulse width detecting circuit 28. Thereby, the change-over switch 29 selects the clamp pulse in FIG. 6C having a pulse width t2 at the rear edge and outputs it to the outside via the buffer 31 and the CLP output terminal 32. This clamp pulse in FIG. 6C is generated in the back porch portion of the video signal as shown in FIG. 7. If the pulse width t2 of the clamp pulse in FIG. 6C is set excessively wide as shown by the broken line (t2') in FIG. 7, it ends up holding even the level of the video signal portion when clamping the pedestal because the section of the back porch portion is narrow. Accordingly, the pulse width t2 of the clamp pulse in FIG. 6C is limited.

In contrast to the general modes of the modes 3, 4 and 5 described above, there are the modes 1 and 2 as special modes in which the external synchronizing pulse and the green video signal containing the synchronizing signal are both input. In the case of the special modes 1 and 2, because the external horizontal synchronizing pulse H or the external composite synchronizing pulse CS is input to the synchronizing input terminal 11, the synchronizing decision circuit 17 decides when the external synchronizing pulse is being input and the "H" level decision output is accordingly supplied to the change-over switches 19 and 24. Thereby, the change-over switch 19 selects the horizontal synchronizing pulse output from the synchronizing separator circuit 15 and supplies it to the pulse generating circuit 26. This is the same with modes 3 and 4 and the pulse generating circuit 26 generates the clamp pulses shown in FIGS. 6B and 6C at the front and rear edges of the horizontal synchronizing pulse in FIG. 6A.

Consider now in the special modes 1 and 2 a case in which the clamp pulse in FIG. 6B at the front edge of the horizontal synchronizing pulse in FIG. 6A is selected similarly to the case of the modes 3 and 4. In the special modes 1 and 2, the green video signal containing the synchronizing signal is input only to the G channel of the video signal in the computer display, the pedestal clamp is carried out in the horizontal synchronizing pulse section when the clamp pulse in FIG. 6B is generated at the front edge of the horizontal synchronizing pulse in FIG. 6A. Then, a brightness of only the G channel among the R, G and B channels increases abnormally, thus producing greenish images.

However, because the pattern of the two inputs to the exclusive-OR circuit 18 in this case is Pattern 2 in FIG. 3, the "L" level signal indicating that the green video signal input together with the external synchronizing pulse and having the synchronizing pulse, is output from the pulse width detecting circuit 28. Thereby, the change-over switch 29 selects the clamp pulse in FIG. 6C at the rear edge of the horizontal synchronizing pulse in FIG. 6A. That is, in the special modes 1 and 2, it is automatically decided that the green video signal containing the synchronizing pulse is being input and the clamp pulse in FIG. 6C at the rear edge of the horizontal synchronizing pulse in FIG. 6A is generated even if the external synchronizing pulse is being input. Thereby, no pedestal clamp is carried out in the section of the horizontal synchronizing pulse when the green video signal containing the synchronizing signal is input and the above-mentioned problem can be avoided.

Because the clamp pulse in FIG. 6B is generated at the front edge of the horizontal synchronizing pulse in FIG. 6A in the modes 3 and 4 in which only the external synchronizing pulse is input as the synchronizing input and there is a sufficient margin from the generating timing thereof to the video section as described above, the pulse width of the clamp pulse in FIG. 6B can be set at any desired value. Accordingly, because the pulse width of the clamp pulse in FIG. 6B can be fully widely set by adopting the modes 3 and 4 as the synchronizing input mode, it becomes possible to deal with the increase of resolution of the computer display or the like even if the horizontal frequency is increased with the increase of the resolution and the interval of the back porch portion becomes narrower.

Further, beside Patterns 1, 2 and 3, there are Patterns 4 and 5 as special patterns in FIG. 3 as described above. Because the "H" level signal, indicating that the green video signal input together with the external synchronizing pulse has no synchronizing pulse, is also output from the pulse width detecting circuit 28 in the case of these two input patterns, the clamp pulse at the front edge of the horizontal synchronizing pulse is generated. Here, in the case of Pattern 4, the pedestal level can be ensured to be held even if the pedestal clamp is carried out in the horizontal blanking period by using the clamp pulse at the front edge of the horizontal synchronizing pulse because the horizontal blanking period of the video signal is black level (pedestal level) and there is a sufficient margin from the time of generating the clamp pulse to the video section, similar to modes 3 and 4, so that a desired pulse width can be set for the pulse width of the clamp pulse.

In the case of Pattern 5, i.e. when the external horizontal synchronizing pulse H is input in the timing outstepping the horizontal blanking period of the green video signal as shown in FIG. 5, on the other hand, the pedestal clamp cannot be carried out by generating the clamp pulse at the rear edge of the horizontal synchronizing pulse like the related art because the generating timing overlaps with the video section. However, the pedestal clamp can be surely carried out by the present invention by generating the clamp pulse at the front edge of the horizontal synchronizing pulse as described above because the generating timing lies within the horizontal blanking section.

It should be noted that although the case in which the clamp pulse at the front edge of the horizontal synchronizing pulse or the clamp pulse at the rear edge thereof is generated by automatically switching the change-over switch 29 at the detection output of the pulse width detecting circuit 28 has been described in the above explanation of the operation, it is also possible to generate the clamp pulse at the front edge of the horizontal synchronizing pulse or the clamp pulse at the rear edge thereof selectively and forcibly, irrespective of the state of the detection output of the pulse width detecting circuit 28, by supplying a switching control signal of the change-over switch 29 from the outside via the control input terminal 30. That is, it is possible to generate the clamp pulse at the front edge of the horizontal synchronizing pulse forcibly by supplying an "H" level control signal from the outside and to generate the clamp pulse at the rear edge of the horizontal synchronizing pulse by supplying a "L" level control signal.

Figure 8:
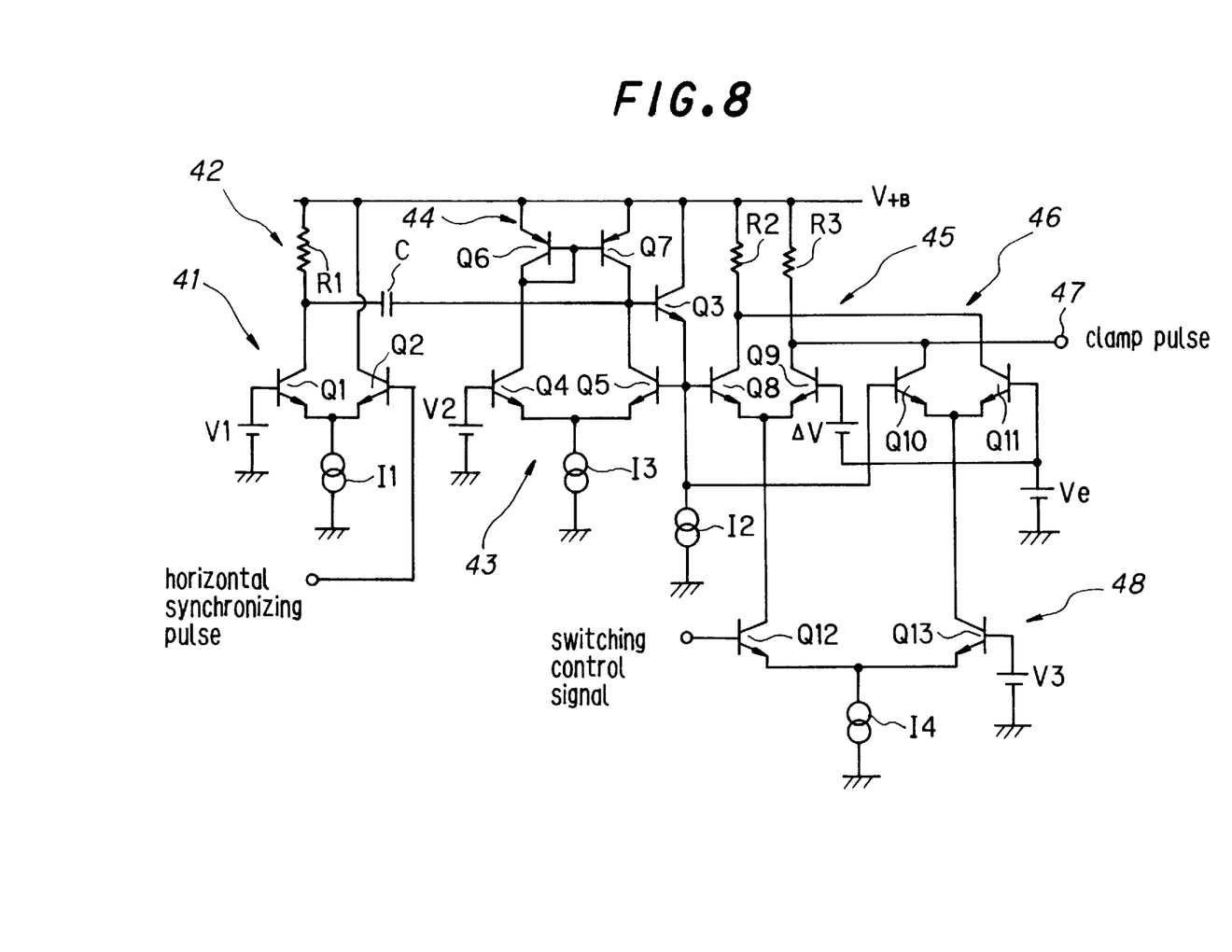
FIG. 8 is a circuit diagram illustrating a concrete circuit structural example of a pulse generating circuit according to a second embodiment of the present invention.

FIG. 8 is a circuit diagram illustrating one example of a concrete circuit structure of the pulse generating circuit 26 in FIG. 2 according to a second embodiment of the present invention. In the figure, a comparator 41 is composed of transistors Q1 and Q2 whose emitters are connected in common and a current source I1 connected between the common emitters and ground. In the comparator 41, a collector of the transistor Q1 is connected to a power supply $V_{+B}$ via a resistor R1 and a collector of the transistor Q2 is connected directly to the power supply, respectively. A horizontal synchronizing pulse applied to a base of the transistor Q2 is compared with a reference voltage V1 applied to a base of the transistor Q1. The collector of the transistor Q1 is connected also to a base of a transistor Q3 of an emitter follower via a capacitor C. A differentiating circuit 42 is composed of the resistor R1 and the capacitor C. An emitter of the transistor Q3 is grounded via a current source I2.

A differential amplifier 43 is composed of transistors Q4 and Q5 whose emitters are connected in common and a current source I3 connected between the common emitters and ground. In the differential amplifier 43, a reference voltage V2 is applied to a base of the transistor Q4 and an emitter output of the transistor Q3 is supplied to a base of the transistor Q5. A diode connection transistor Q6 is connected between a collector of the transistor Q4 and the power supply and a transistor Q7 whose base is connected in common with the transistor Q6 is connected between a collector of the transistor Q5 and the power supply. A current mirror circuit 44 is composed of those transistors Q6 and Q7.

Two comparators 45 and 46 are composed of transistors Q8 and Q9 and transistors Q10 and Q11, respectively. The emitters of the two transistors in each of the comparators 45 and 46 are connected in common. The collectors of the transistors Q8 and Q11 are connected to the power supply via a common resistor R2 and the collectors of the transistors Q9 and Q10 are connected to the power supply via a common resistor R3 as well as commonly to a circuit output terminal 47. In one comparator 45, an emitter output of the transistor Q3 is supplied to the base of the transistor Q8 and a reference voltage Ve+ΔV is applied to the base of the transistor Q9. In the other comparator 46, the emitter output of the transistor Q3 is supplied to a base of the transistor Q10 and a reference voltage Ve is applied to the base of the transistor Q11.

A collector of a transistor Q12 is connected to the common connecting point of the emitters of the transistors Q8 and Q9 and a collector of a transistor Q13 is connected to the common connecting point of the emitters of the transistors Q10 and Q11, respectively. Emitters of the transistors Q12 and Q13 are connected in common and are grounded via a current source I4. Then, a switching circuit 48 is provided which activates the comparator 45 when a signal level of a switching control signal applied to the base of the transistor Q12 is greater than a reference voltage V3 applied to the base of the transistor Q13 and activates the comparator 46 when the switching control signal level is lower than the reference voltage. This switching circuit 48 corresponds to the change-over switch 29 in FIG. 2. Accordingly, the control signal input via the synchronizing decision circuit 17 or the control input terminal 30 in FIG. 2 is the switching control signal applied to the base of the transistor Q12.

Figures 9A, 9B:
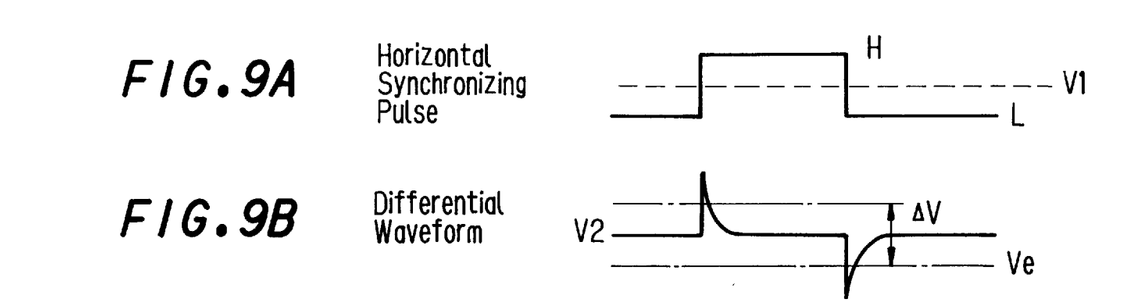
FIGS. 9A through 9D are waveform charts for explaining the operation of the embodiment shown in FIG. 8.

Next, the circuit operation of the pulse generating circuit 26 constructed as described above will be explained with reference to waveform charts shown in FIGS. 9A through 9D. When a horizontal synchronizing pulse shown in FIG. 9A is applied to the base of the transistor Q2 in the comparator 41 in the input stage, a differential waveform shown in FIG. 9B is obtained at the emitter of the transistor Q3 by the operation of the differentiating circuit 42. This differential waveform shown in FIG. 9B is a waveform whose reference level is the reference voltage V2 applied to the base of the transistor Q4. This waveform is compared with the reference voltages Ve+ΔV and Ve in the comparators 45 and 46.

Figure 9C:
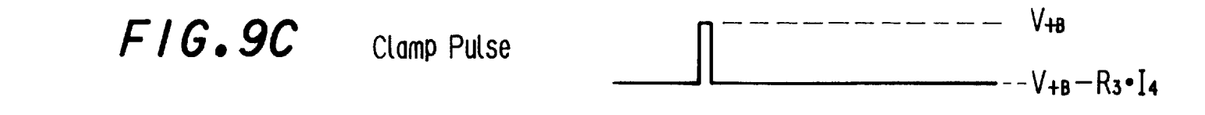

Here, in case of the modes 3 and 4 in which only the external synchronizing pulse is input as the synchronizing input, the "H" level detection output is applied from the pulse width detecting circuit 28 in FIG. 2 to the base of the transistor Q12 of the switching circuit 48 as the switching control signal. Thereby, the comparator 45 is activated because the transistor Q12 is turned ON. Because the differential waveform in FIG. 9B is compared with the reference voltage Ve+ΔV in the comparator 45, a clamp pulse shown in FIG. 9C is derived as a collector output of the transistor Q9 at the front edge of the horizontal synchronizing pulse in FIG. 9A.

Alternatively, in the case of mode 5, in which only the green video signal containing the synchronizing signal is input as the synchronizing input, the "L" level decision output is applied from the pulse width detecting circuit 28 in FIG. 2 to the base of the transistor Q12 of the switching circuit 48 as the switching control signal. Thereby, the comparator 46 is activated because the transistor Q13 is turned ON. Because the differential waveform in FIG. 9B is compared with the reference voltage Ve in the comparator 46, a clamp pulse shown in FIG. 9D is derived as a collector output of the transistor Q10 at the rear edge of the horizontal synchronizing pulse in FIG. 9A.

Figure 9D:
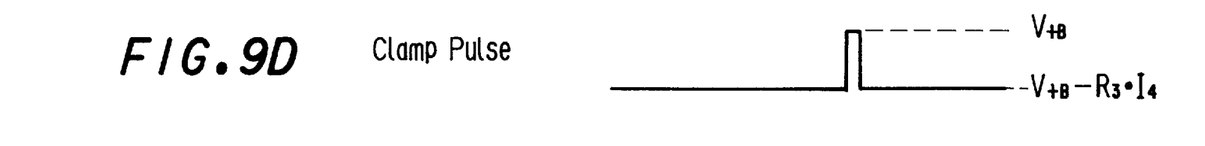

Further, in the case of the special modes 1 and 2, because the "L" level detection output is applied from the pulse width detecting circuit 28 in FIG. 2 to the base of the transistor Q12 as the switching control signal, the clamp pulse shown in FIG. 9D is generated at the rear edge of the horizontal synchronizing pulse in FIG. 9A similar to the case of mode 5.

It should be noted that the circuit structure of the pulse generating circuit 26 described above is merely one example and does not limit the invention. That is, although the circuit structure shown in the above-mentioned example produced a pulse width of the clamp pulse in FIG. 9C generated at the front edge of the horizontal synchronizing pulse in FIG. 9A and that of the clamp pulse in FIG. 9D generated at the rear edge being set equal, it is also possible to structure a circuit in which the pulse width of the clamp pulse in FIG. 9C generated at the front edge is set long for the reason described before. This can be accomplished by a circuit structure in which a time constant of the differentiating circuit 42 in FIG. 8 is switched or a circuit structure in which the voltage ΔV of the reference voltage Ve+ΔV is changed.

As described above, according to the present invention, the clamp pulse generating circuit is equipped with a function for deciding whether the video signal containing a synchronizing pulse is being input or not in addition to a function for deciding whether an external synchronizing pulse is being input or not and is constructed so as to generate the clamp pulse at the front edge of the external synchronizing pulse when the external synchronizing pulse is being input and to generate the clamp pulse at the rear edge of the synchronizing pulse when the video signal containing the synchronizing pulse is being input irrespective of whether the external synchronizing pulse is being input or not, so that in the mode when only the external synchronizing pulse is input as the synchronizing input, a desirable pulse width can be set as the pulse width of the clamp pulse because there is a sufficient margin between the clamp pulse generating timing and the video signal section to deal with the special mode in which the both the external synchronizing pulse and the green video signal containing the synchronizing signal are input as the synchronizing input.

While preferred embodiments have been described, variations thereto will occur to those skilled in the art within the scope of the present inventive concepts which are delineated by the following claims.

What is claimed is:

1. A clamp pulse generating circuit, comprising:

a synchronizing input terminal for inputting an external synchronizing pulse;

synchronizing decision means for deciding whether said external synchronizing pulse is being input or not;

a video input terminal for inputting a video signal containing a synchronizing pulse;

video decision means for deciding whether said video signal is being input or not;

pulse generating means for generating a clamp pulse at the front edge of said external synchronizing pulse when the decision result of said synchronizing decision means indicates that the external synchronizing pulse is being input and for generating a clamp pulse at the rear edge of the synchronizing pulse when the decision result of said video decision means indicates that the video signal is being input, irrespective of the decision result of said synchronizing decision means; and a clamp pulse output terminal for outputting the clamp pulses generated by said pulse generating means to the outside.

2. The clamp pulse generating circuit according to claim 1, wherein said video decision means comprise an exclusive-OR circuit having two inputs of said external synchronizing pulse and the synchronizing pulse within said video signal, a change-over switch for selecting an output of said exclusive-OR circuit when the decision result of said synchronizing decision means indicates that said external synchronizing pulse is being input and selecting the ground level when no external synchronizing pulse is being input, and a pulse width detecting circuit for comparing a pulse width of an output of said change-over switch with a predetermined pulse width, and a detection output of said pulse width detecting circuit is taken as the result of the decision whether said video signal is being input or not.

3. The clamp pulse generating circuit according to claim 1 or 2, further comprising a control signal input terminal for inputting a control signal from outside, said control signal, when being input, making said pulse generating means generate the clamp pulse at the front or rear edge of the synchronizing pulse in response to the control signal irrespective of the decision result of said synchronizing decision means.

* * * * *